United States Patent [19]

Stofko

[11] Patent Number: 4,504,205

[45] Date of Patent: Mar. 12, 1985

[54] APPARATUS FOR CONVERTING A CONDUCTION PRESS FOR CONSOLIDATION OF PRODUCTS BY HEAT AND PRESSURE TO A CONVECTION PRESS

[75] Inventor: John Stofko, St. Charles, Ill.

[73] Assignee: Carbocol Inc., Beaverton, Oreg.

[21] Appl. No.: 426,423

[22] Filed: Sep. 28, 1982

[51] Int. Cl.[3] .......... B29C 15/00

[52] U.S. Cl. .......... 425/181; 100/93 P; 425/193; 425/233; 425/411

[58] Field of Search .......... 264/109, 120, 123; 425/181, 193, 233, 406, 84, 411; 100/93 P

[56] References Cited

U.S. PATENT DOCUMENTS

| | | | |
|---|---|---|---|
| 2,622,276 | 12/1952 | Wilson | 264/109 |
| 3,086,248 | 4/1963 | Culp | 425/DIG. 60 |
| 3,295,167 | 1/1967 | Corbin | 100/93 R |
| 3,619,450 | 11/1971 | Futo | 264/109 |
| 3,683,383 | 8/1972 | Makinen | 264/123 |
| 3,891,738 | 6/1975 | Shen | 264/101 |
| 4,162,877 | 7/1979 | Nyberg | 425/406 |
| 4,409,170 | 10/1983 | Stofko | 425/420 |

*Primary Examiner*—Jan Silbaugh
*Assistant Examiner*—V. Fischbach
*Attorney, Agent, or Firm*—Karl W. Flocks; Sheridan Neimark

[57] ABSTRACT

A conventional conduction pressing apparatus for consolidating of composite products by pressure and heat is converted to a press in which heating is carried out by convection. This is accomplished by providing caul plates for use on the working surfaces on the press plattens, the caul plates having a central permeable area and a peripheral impermeable area, as well as appropriate sealing elements. Holes are drilled through the press plattens in order to provide a passageway for steam from an outside source to the central permeable areas of the caul plates.

10 Claims, 8 Drawing Figures

APPARATUS FOR CONVERTING A CONDUCTION PRESS FOR CONSOLIDATION OF PRODUCTS BY HEAT AND PRESSURE TO A CONVECTION PRESS

FIELD OF THE INVENTION

The present invention relates to the consolidation of products and, more particularly, apparatus primarily for the consolidation of lignocellulosic materials using pressure and convection heating.

BACKGROUND

It has been recognized that by injecting and releasing steam into and out of composite products during consolidation thereof using heat and pressure, several improvements can be achieved, a main one of which is the increase of heat transfer rates which significantly speeds up curing of thermosetting adhesives. Several methods and types of apparatus have been proposed to achieve this objective.

Corbin U.S. Pat. No. 3,295,167 discloses a steaming apparatus for consolidation of composite products, composed of a source of superheated steam which is fed into a platen having a chamber and a plurality of openings communicating the chamber with the material undergoing consolidation. By passing through and out of open pressed products, steam speeds up heat transfer and curing of thermosetting resins.

Futo U.S. Pat. No. 3,619,450 proposes a gas-tight envelope made of Teflon sheet, reinforced in suitable manner, surrounding press platens with pressed products therebetween, for the purpose of controlling the ambient atmosphere in and around the pressed products.

Shen U.S. Pat. No. 3,891,738 shows a press platen which, in addition to providing conventional internal heating by passing heating fluids through a closed labyrinth of interconnected passageways, has an additional chamber and aperture openings on the surface adjacent to the product undergoing pressing for injecting steam into the product. Steam passes from a chamber of one press platen through openings into the pressed product and from there into the opposite press platen, thus speeding up curing of thermosetting resins.

Nyberg U.S. Pat. No. 4,162,877 discloses one platen almost identical to that of Shen, instead of two platens with chamber and aperture openings on the surface which comes into contact with the product. Steam is injected from the press platen through the openings into the product and released back through the same openings into the platen after curing the thermosetting resin in the product.

The Makinen U.S. Pat. No. 3,686,383 discloses a system involving two stages of pressing. In the first stage, steam is withdrawn from an open press, while in the second stage the product is pressed in a closed press for a time of up to thirty-eight minutes.

In all the known prior systems which attempt to utilize the positive effects of steam injection into products undergoing consolidation, the prior workers have invariably provided special presses and have failed to produce a simple and dependable means of converting an existing press to steam injection pressing. Thus, methods of the above-described prior art require complex press platens which are, in fact, double platens in the sense that they possess double systems, i.e. a first conventional passageway system for heating fluids by conduction heating; and an open passageway system for steam injection heating. In some cases a new platen has been added to a conventiona platen so that each press platen is composed of two separate platens, one conventional for conduction heating and the other especially designed for steam injection heating.

Thus, a conversion of an existing conventional conduction press to a press for simultaneous conduction and convection heat transfer requires the replacement of existing press platens by such double platens which are more complex and more expensive. Because such platens are heavy, replacement is time consuming and is associated with substantial losses of production time, to say nothing of capital costs. When it is realized that some presses are as large as 8 feet by 60 feet, e.g. for making mobile home walls, it can be readily understood that just the capital costs involved in the provision of new presses can be very substantial.

Moreover, press platens for such dual heat transfer as proposed in the prior art, i.e. both conduction and convection, are not dependable. Passageways in platens for steam injection inevitably become filled with deposits from binders and wood extractives which block the passageways, particularly after considerable periods of continuous operation. It is very difficult, if not virtually impossible, to clean the passageways so that they function properly. Therefore, providing such very expensive dual function plattens is not economically feasible.

SUMMARY OF THE INVENTION

In accordance with the invention, a simple, efficient, inexpensive and dependable system for the conversion of conventional presses has now been devised. It is, accordingly, an object of the invention to overcome deficiencies of the prior art, such as those indicated above. It is another object of the invention to facilitate the production, in a more economical manner, of consolidated products. It is yet another object of the invention to provide an improved apparatus for consolidation of products by pressure using heat transferred substantially entirely by convection. And it is still a further object of the invention to provide a system for converting an already existing conduction press into a convection press in a simple and inexpensive way.

In accordance with the invention, it is possible in a simple, efficient, inexpensive and dependable way to convert a conventional conduction press into a press based on heat transfer substantially entirely by convection. This conversion does not require replacement of existing press platens by new platens or the addition of new platens for steam injection, to existing platens. Instead, the means for steam injection and distribution into the materials undergoing consolidation are provided by special design of caul plates which cover one or both engaging surfaces of the press platens and by minor modifications of existing press platens.

The caul plates, according to the present invention, incorporate two or three distinct areas, depending on the size of the press platens and the desirable conditions of steam pressing:

(1) A central area horizontally and vertically permeable to fluids;

(2) A fluid impermeable edge area; and (3) Optionally an intermediate area only horizontally permeable, located between the central and edge areas.

The central area is in the middle or center portion of the caul plate and is smaller than the area of the consolidated product produced by the plates. The intermediate area surrounds the central area and the edge area surrounds the intermediate area and represents the periphery of the caul plates. These caul plates are also provided with suitable sealing gaskets along their press platen engaging surfaces, such gaskets being located along the periphery of the caul plate, thereby serving to prevent fluids from escaping from the permeable areas of the caul plates or from the interior of the closed press during use, out into the ambient atmosphere.

Steam from a suitable outside source is introduced into the area between the caul plates and press platens in the closed press and is injected into the products undergoing consolidation through suitable passageways which may comprise horizontal holes drilled or otherwise provided in the heavy press platens from the edge thereof to a depth slightly beyond the impermeable edge area of the caul plates, and then by vertical holes passing from the ends of such horizontal holes to the press platen/caul plate engaging surface so as to provide communication between the horizontal and vertical holes bored in the press platens and the vertically permeable central area of the caul plates. Alternatively such passageways may comprise grooves in the caul plates communicating with headers, such headers being attached to one or two edges of the caul plate, and connected to the outside source of steam and the central vertically permeable area of the plates.

For a consolidation which requires closed steam pressing, suitable means are needed for peripheral enclosure of products undergoing consolidation between the press platens. Such an enclosure, according to the invention, is provided by a peripheral sealing frame made of compressible heat resistant plastomer or elastomer supported from the outside by a rigid solid wall providing a lateral support for the plastic frame against steam pressure acting from the interior of the pressing area on the plastic frame.

The conversion of a conventional pressing apparatus including conventional massive conduction press platens to a pressing apparatus for substantially entirely convection heat transfer according to the invention, can thus be accomplished at low investment cost and minimal loss of production associated with the conversion, to provide a dependable and effective system.

The instant invention is related to my co-pending application Ser. No. 254,224, now U.S. Pat. No. 4,357,194 which discloses a method for consolidation of lignocellulosic materials by steam injection using a bonding system and a new pressing apparatus based on heat transfer to produce such products solely by convection. It is also related to my co-pending application U.S. Ser. No 336,481, now U.S. Pat. No. 4,409,170 which relates to a simple and inexpensive apparatus for carrying out the method of application Ser. No. 254,224. The apparatus of the instant invention differs from those disclosed in the two afore-mentioned applications in that it relates to means for converting already existing equipment to convection heating, thereby accomplishing the objectives of said afore-mentioned two patent applications (which are incorporated by reference) without the replacement of exising equipment, the converted equipment functioning to heat products being pressed substantially entirely by convection.

BRIEF DESCRIPTION OF DRAWING

The above and other objects in the nature and advantages of the instant invention will be more apparent from the following detailed description of embodiments, taken in conjunction with the drawing wherein.

DETAILED DESCRIPTION OF EMBODIMENTS

Figure 1:
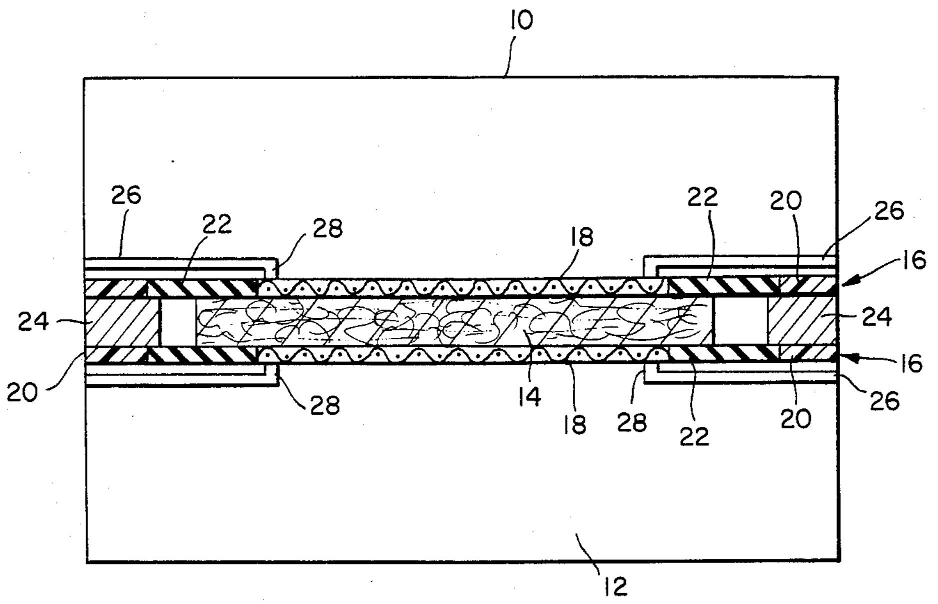
FIGS. 1-3 are schematic, vertical sectional views of embodiments of the instant invention.

With reference to FIG. 1 there is schematically shown the modification of two conventional, internally heated press platens 10 and 12 between which is being squeezed a product 14 undergoing consolidation. The upper and lower press platens 10 and 12 are modified, according to the invention, by the provision of caul plates 16 located between the product 14 and the press platens 10 and 12.

The caul plates according to the invention for accomplishing the conversion of the conventional upper and lower press platens 10 and 12 can be realized in several ways, one possible construction of which is shown in FIG. 1. Thus, in FIG. 1 the caul plates 16 are flexible bodies, the central areas of which are made of one or more superimposed screen wires or screen cloths 18. The porosity of the screens 18 thereby provides the necessary horizontal and vertical permeability in the central area through which steam, which provides the desired heating by convection, can pass to the product 14. The impermeable edge area is suitably produced by filling the screen along the periphery with one or more heat resistant materials, e.g. plastomers or elastomers.

Thus, the peripheral area 20, which when the press is closed may be under considerable pressure, is desirably filled with rigid heat-resistant plastic of high compressive strength, such as metal filled epoxy resin or asbestos fiber material. On the other hand, the annular portion 22 lying between the peripheral portion 20 and the central, open (screened) portion 18, is suitably filled with a compressible heat-resistant elastomer, such as silicone rubber. The annular area 22 of silicone rubber or the like provides the caul plate 16 with a sealing gasket between the press plattens 10 and 12 and the caul plates 16. In addition, the system includes suitable stop bars 24 extending peripherally about the product 14, which stop bars 24 exert pressure on the peripheral portions 20 of the caul plates 16, the stop bars 24 cooperating further with the rubber seals 22 to prevent escape of steam from the interior of the press when closed.

Steam is introduced into the horizontally permeable area of the caul plates through suitable horizontal holes 26 drilled into the press platens 10 and 12 from the edge thereof to a depth usually less than five inches, and then through vertical holes 28 drilled perpendicularly to the horizontal holes 26 from the caul plate engaging surfaces of the press platens, in order to communicate the entrance end of the horizontal holes 26 with the permeable area of the caul plates. Headers communicate the inlet ends of the holes 26 with a suitable source of steam.

Figure 2:
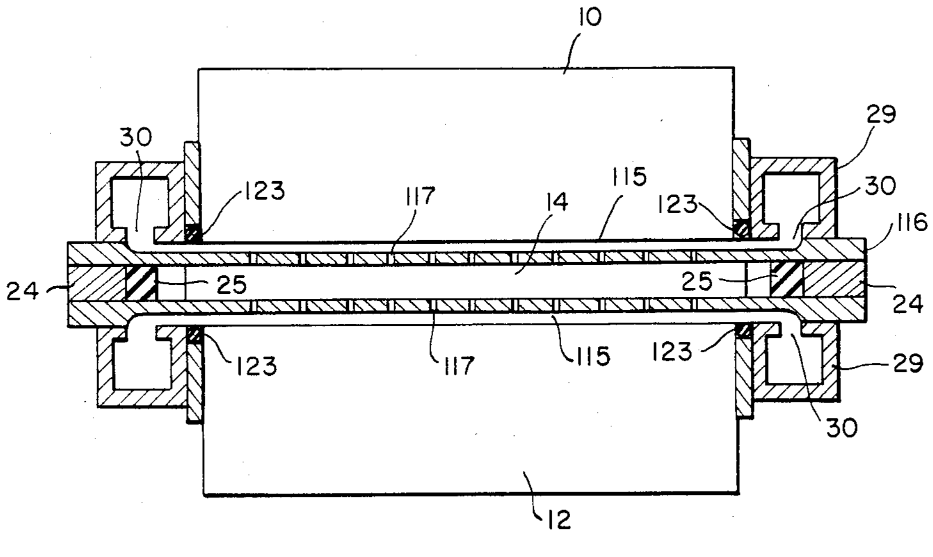
Figure 4B:
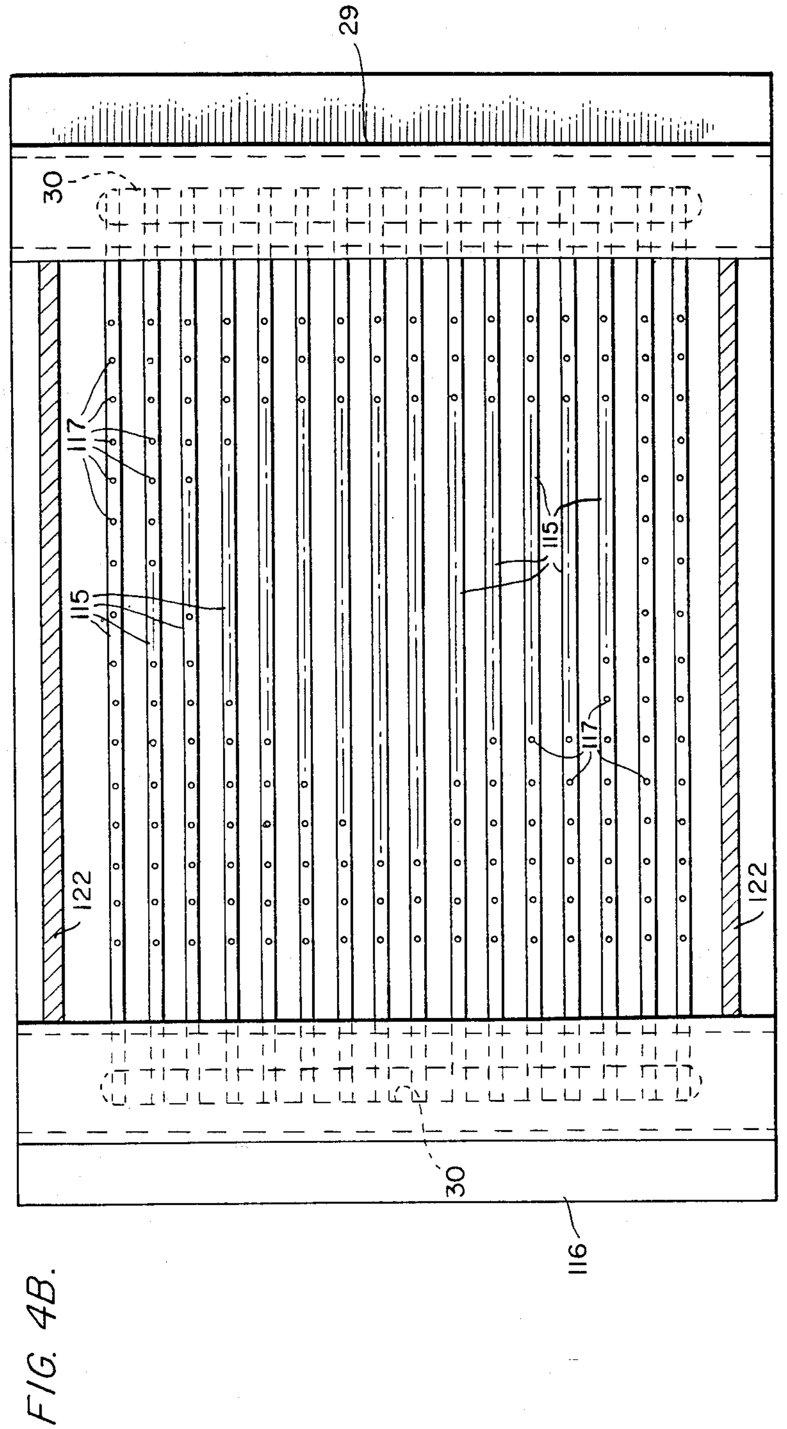
FIG. 4A is a vertical sectional view and FIG. 4B a plan view of a plate according to the embodiment of FIG. 2.
Figure 4A:
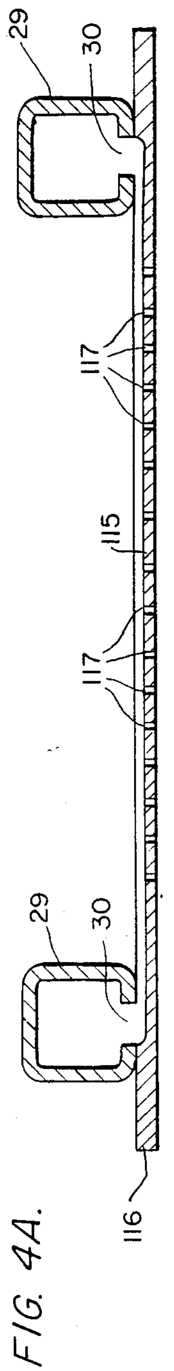
Figure 5B:
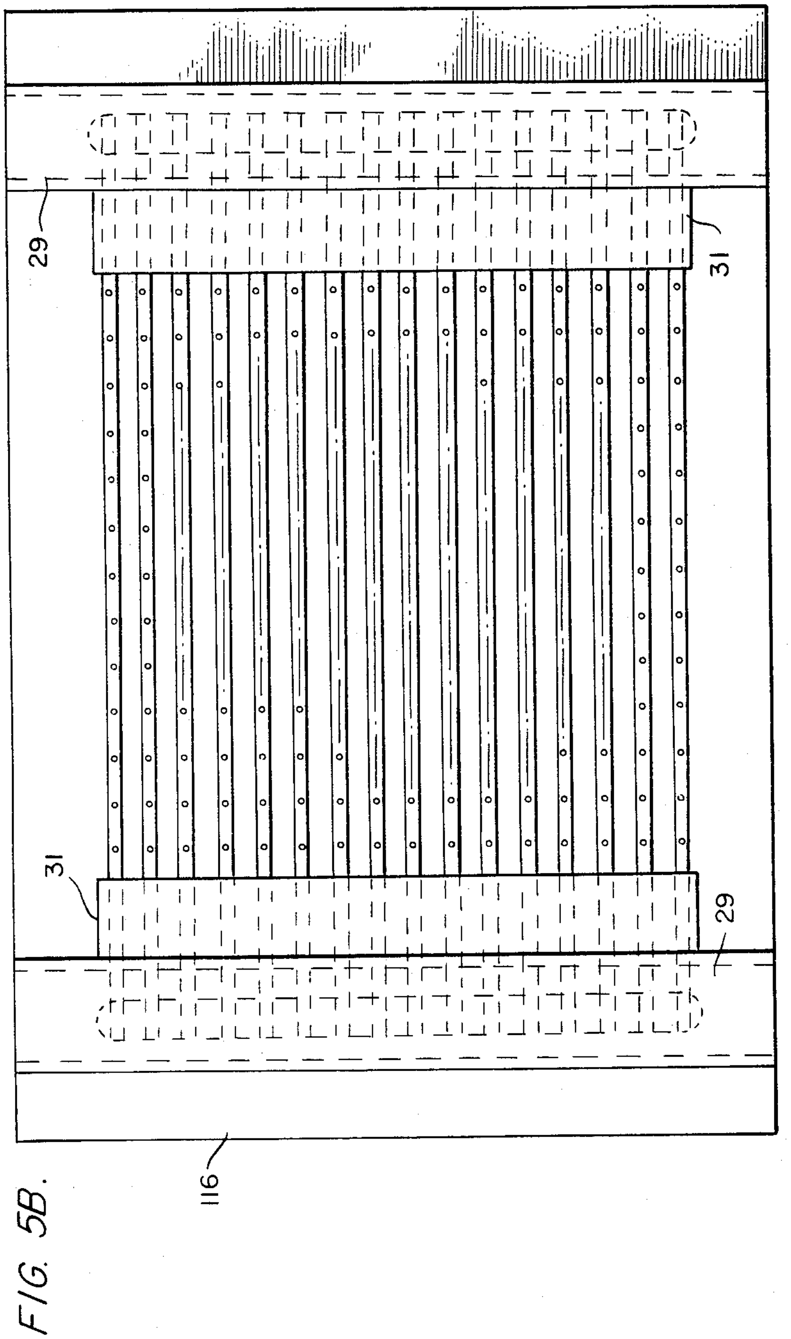
FIG. 5A is a vertical sectional view and FIG. 5B a plan view of a plate used in the embodiment of FIG. 3.
Figure 5A:
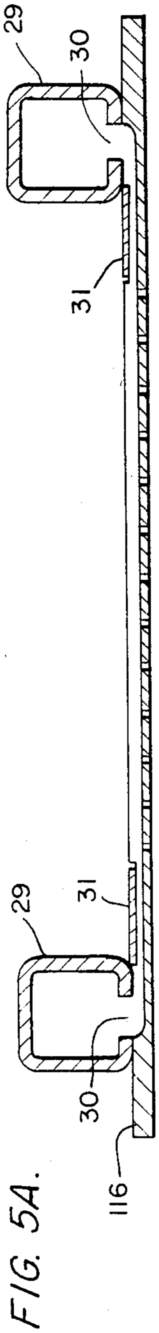

Another embodiment of press conversion according to the invention is shown in FIGS. 2 and 4 where like reference numerals designate like parts. Here the press platens 10 and 12 are provided with caul plates 116.

Horizontal permeability over the intermediate and central areas of the caul plates 116 is provided by machining grooves 115 in the surface of the caul plate which faces and engages its respective press platen 10, 12. Vertical permeability is provided by holes or slots 117 drilled or cut through the caul plates 116 in the central area thereof from the grooves 115 to the opposite face of each caul plate, i.e. to the surface of the caul plate which faces the product 14. No grooves, holes or slots are provided in the caul plates 116 in the peripheral edge areas thereof, and so the edges of the caul plates 16 remain impermeable to fluids.

To help seal the caul plates 116 adjacent the press platens 10 and 12, suitable gaskets 122 and 123 are provided, such gaskets being desirably formed of heat resistant elastomer such as silicone, and preferably being provided in a suitable annular groove formed within the press facing surface of each caul plate 116. In addition, to prevent the escape of steam from within the pressing cavity in which the product 14 is being consolidated, a peripheral elastomeric seal 25 is suitably provided adjacent, and immediately inside of the periphery of the stop bars 24.

Figure 3:
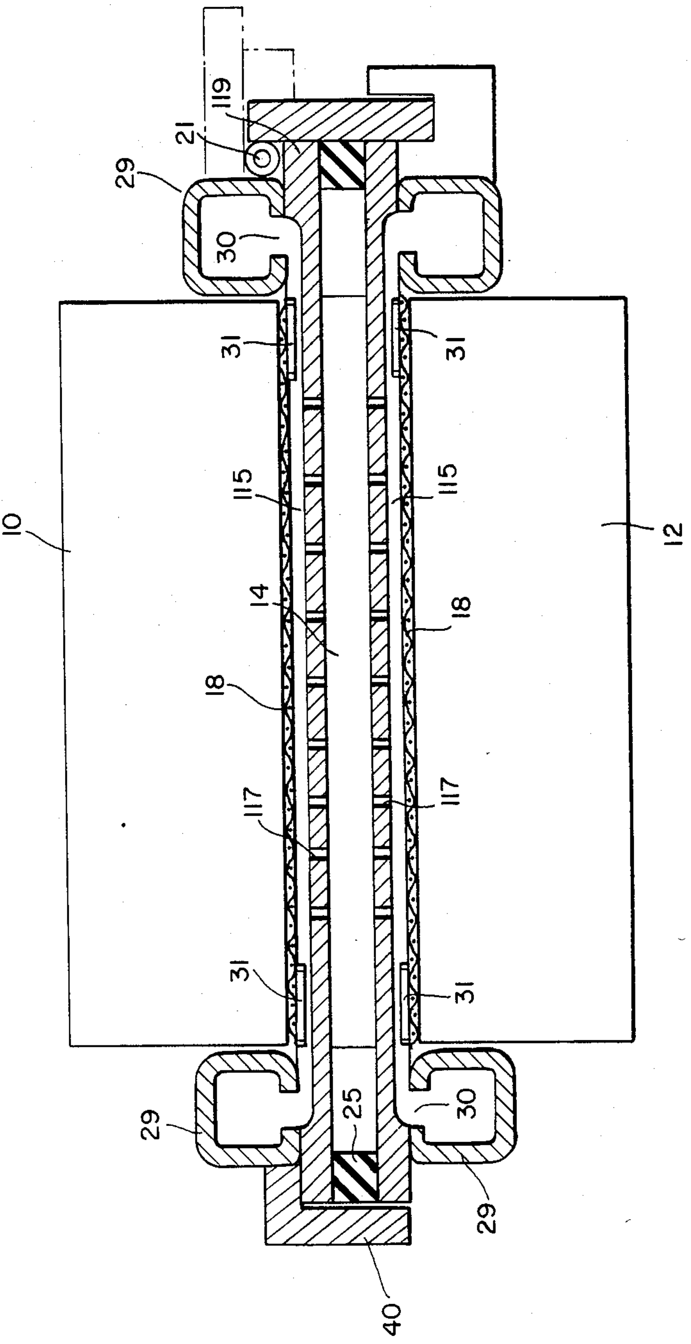

Steam is introduced into the central horizontally and vertically permeable area of the caul plate, in the embodiments of FIGS. 2 and 3, through grooves 115 extending to headers 29, the latter of which are rectangular or circular pipes attached to plates on two convenient opposite sides thereof. Such pipes which form the headers 29 are slotted along the side thereof which engages the caul plates to provide an opening 30 communicating with the ends of the grooves 115.

With reference to FIG. 3, there is shown a variation of the embodiment of FIG. 2 described above. Here the grooves 115 are, in the intermediate area between the headers 29 and the central vertically permeable area of the plates, covered by a thin sheet 31 suitably formed of sheet metal which sheet 31 is attached to the plate and converts the grooves 115 to closed channels in such intermediate area, i.e. between the slots 30 of the headers 29 and the central area of the plates. By creating such closed channels instead of using sealing gaskets 122 and 123, as in the embodiment of FIG. 2, a screen wire 18 possessing an annular ring and filled with sealing heat-resistant materials, as the screen wire having the annular ring 20 filled with sealing heat-resistant materials 22 as in the embodiment of FIG. 1, can be used as a means of sealing the central vertically and horizontally permeable area between plates 119 and press platens 10 and 12. The screens 18 which are open in the central area make possible the elimination or reduction of the size of the grooves 115 in the central area of the plates 119.

As in the plates of FIG. 2, steam is introduced into the central area of the plates through the channel grooves from headers 29 attached to the plates and connected to an outside source of steam. In the embodiment of FIG. 3, an alternative way of providing lateral support for a peripheral elastomeric seal 25 is shown; here suitable peripheral walls 40 are provided which are attached to the outside vertical surface of the upper caul plates 116 or 119, or the press platen 10.

In the embodiments illustrated in FIGS. 1–3, the top caul plates 16, 116, 119 are attached to the press platens 10 in order for such caul plates to be able to move vertically with the upper press platten 10. It is also desirable that the bottom caul plates 116 and 119 adjacent the bottom press platen 12 be attached thereto; on the other hand, the bottom caul plate 16 can either be attached or can merely lie on the bottom press platen 12 held by gravity so that such bottom caul plate can move in and out of the press along with the product 14 to be consolidated.

A conventional press converted to heat transfer by convection according to the invention can be used in different ways depending on the desired temperature to be developed in the product. If the consolidation time for the product 14 requires short time exposure to temperatures of 212°–250° F., open steam pressing can be utilized. If temperatures higher than about 250° F. are desired, particularly for longer periods, then sealed steam pressing should be used.

In open steam pressing, steam is injected through the vertically permeable area of the caul plates into the product 14 where it releases its heat of vaporization through the condensation thereof, thereby increasing the temperature of the product and effecting consolidation thereof. As injected high pressure steam expands to atmospheric pressure in the product, there is no need for sealing the product between the press platens.

On the other hand, for sealed steam pressing at temperatures higher than about 250° F., the steam is injected through the vertically permeable central area of the caul plates into the product 14, which product 14 is hermetically enclosed in a cavity formed by the press platens 10, 12 and a peripheral wall provided along the edges of the platens 10, 12, until the desired steam pressure is developed within the product 14. For this kind of steam pressing, the apparatus must be provided with means for hermetically enclosing the product 14 between the press platens 10, 12.

Such peripheral enclosure means may be provided in a number of ways. In FIG. 1, as noted above, the annular elastomeric sealing gasket 22 functions not only to prevent escape of steam from between the press platens and caul plate, but also in cooperation with the stop bars 24 as a peripheral enclosure means to prevent escape of steam from the press cavity. As also already pointed out above, a peripheral elastomeric seal 25 as used in the embodiments of FIGS. 2 and 3 may alternatively suitably provide such a peripheral enclosure means, desirably formed of compressible heat-resistant silicone rubber or asbestos fiber material. Such a seal or closure wall is in sealing engagement with the surfaces of the upper and lower caul plates 116 or 119 when the press is in closed position. More desirably, the stop bars 24 (FIG. 2) or the like are located outside of the peripheral elastomeric seal 25 in order to provide a lateral support for such elastomeric seal against internal steam pressure.

Such rigid lateral supports can be fixed in a variety of ways. The simplest way is shown in FIG. 2 in which the stop bars 24 are attached to either of the press platens 10 or 12 so as to form either a continuous frame or four discontinuous bars along the four edges of the press platens.

FIG. 3 shows an alternative way of providing the lateral support for the peripheral elastomeric seal 25. Here suitable peripheral walls 40 are provided which are attached to the outside vertical surfaces of the upper caul plates 116 or 119.

In a further variation of the alternative of FIG. 3, one or two of the lateral supports 20, as shown in FIG. 3, can be made movable. In FIG. 3, one lateral support 40 is mounted to the hinge 21 attached to the top plate 119. As shown in phantom, when the press is open the bar 40 is swung out of the way to provide clearance for loading the press with material to be consolidated. The seal 25 is attached to the bar 40.

The means for peripheral enclosure of products between the press plattens according to the invention, including the examples given above, have the advantage in that they can be used as permanent parts of the press for producing products of quite variable thickness.

The operation of a multi-opening press, converted to heat transfer by convection according to the invention, is explained by reference to schematic FIG. 6. Steam is fed from a steam source 50 through a pipe 52 into a main valve 54. When the valve 54 is open, steam passes through pipes 56 and 58 to, respectively, valves 60 and 62. If valve 60 is open and valve 62 is closed, steam passes through valve 60 and then through pipes 64 and 65 and then into pipes 66 and 67. Each of the pipes 66 and 67 is provided with a number of side hoses 161–165, and 171–175, respectively. Steam passes through the flexible side hoses into suitable headers which pass steam from the flexible hoses into the horizontal holes 26 drilled into the press platens or to the grooves 115 in the caul plates. From there, the steam penetrates into the products undergoing consolidation as pointed out above, particularly with respect the description of the embodiments of FIGS. 1–3.

Figure 6:
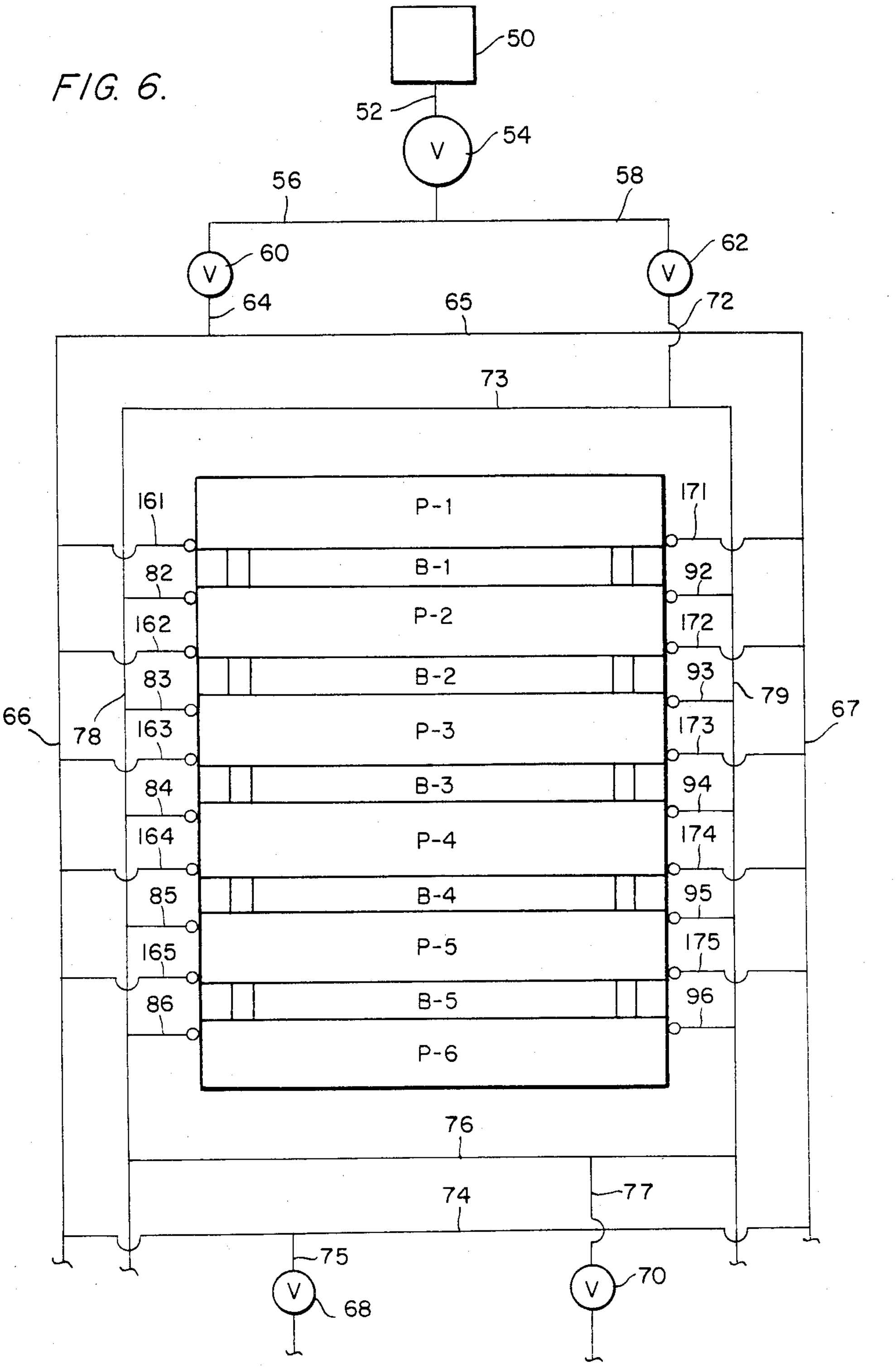
FIG. 6 is a schematic diagram illustrating the feed of steam to a press assembly.

For purposes of simplicity, the modified press platens in FIG. 6 are identified by the characters P-1 througn P-6, and the products undergoing consolidation therebetween are identified by the reference characters B-1 through B-5. With the press closed, filled with the products B-1 through B-5 to be consolidated, steam passes from the central permeable open space of the top caul plates forming a part of the modified press platens P-1 through P-5 and enters the boards to be consolidated B-1 through B-5. With the press closed and the valve 68 closed, but with the valve 70 open, steam enters the boards to be consolidated B-1 through B-5 and then out the bottom of such boards to the opposite permeable areas of the bottom caul plates, and then into flexible hoses 82–86 and 92–96, and from there into pipes 78 and 79 and then into pipes 76 and 77 and finally through the release valve 70 and out of the system. When steam enters the valve 70, air from the boards B-1 through B-5 and from between the press platens has been replaced by steam.

If the curing temperature of the binder is 212–250 degrees F., such as in the case of urea-formaldehyde resins, at the instant the steam enters the valve 70, the products being consolidated B-1 through B-5 have already reached the temperature of 212 degrees F.; accordingly, after an additional few seconds, curing of the resin is completed. At this point, the valve 68 is opened to release the residual steam from the consolidated product and when no further steam passes from the two valves 68 and 70, the press can then be opened and the boards removed therefrom.

If a binder is used requiring curing temperatures greater than 250 degrees F., the process is somewhat different than as described immediately above. In this case, the process starts the same, but when steam begins to escape from valve 70, such valve is closed and valve 62 is opened, which results in introducing steam into pipes 72 and 73, and then into pipes 78 and 79, and from there through flexible hoses 82–86 and 92–96 into the headers and permeable spaces of the caul plates located adjacent the bottoms of the boards to be consolidated B-1 through B-5. Using this operation, it can be seen that steam is passed into the boards to be consolidated from both sides thereby achieving faster, more uniform steam distribution in the product.

When the desired final pressure is reached, as indicated by a suitable pressure gauge, the valves 60 and 62 are closed and steam is maintained in the products undergoing consolidation for the time necessary to complete the consolidation process. Once consolidation has been completed, the valves 68 and 70 are opened and steam is released from the press through the pipes 66, 67, 78, 79, 76, 77, 74 and 75 out into the atmosphere or, preferable, into a suitable expansion and condensation space for recycling (not shown).

Of course, the sequence of steam introduction can be reversed, if desired, or steam can be introduced into the press through the valves 60 and 62 at the same time. The sequential steam injection from one side and venting air from the other side, as described, provides a possibility of controlling the steam distribution during the manufacture of consolidated products. Injection and release of steam from both sides of consolidated products speeds up pressurizing and de-pressurizing of products by steam, which reduces the total press cycle and produces boards of balanced structure.

It is to be understood that the invention is not limited to the embodiments disclosed above which are illustratively offered, and that modifications may be made without departing from the scope of the invention.

What is claimed is:

1. A kit apparatus for converting a conduction press for consolidation of products by heat and pressure to a convection press therefor; wherein said conduction press comprises a frame, upper and lower press platens supported by said frame, means for moving said platens relative to each other, and means for heating said platens with heating fluids; said kit comprising a pair of caul plates, a first for use in conjunction with said upper press platen and a second for use in conjunction with said lower press platen, each said caul plate having a central area which is permeable to steam both horizontally and vertically and a fluid impermeable edge area circumferentially surrounding said central permeable area; sealing means for inhibiting the escape of steam from the central permeable area operatively associated therewith; means for attaching said first caul plate to said upper platen; and means for providing for the feeding of steam to said central permeable area, so that said conduction press platens remain in place after conversion.

2. A press apparatus converted from a conduction press for consolidation of products by heat and pressure to a convection press therefor, comprising: an upper press platen having a lower working face and a lower press platen having an upper working face; an upper caul plate attached to the lower working face of said upper press platten; a lower caul plate on the upper working face of said lower press platen; each of said caul plates being formed with a central permeable area and a surrounding impermeable area along the peripheral edge thereof; sealing means for inhibiting fluid from escaping from the permeable areas of said caul plates; and steam feeding means provided in said upper and lower press plates for feeding steam from a source outside said press platens to the central permeable area of said caul plates.

3. A modified press apparatus for consolidation of products by heat and pressure, converted from a press transferring heat by conduction into a press transferring heat by convection, comprising: a pair of press platens having means for the internal heating thereof and facing surfaces, said press platens being movable so that said facing surfaces move toward and away from each other, said platens being provided with holes drilled parallel to the facing surfaces thereof from the edges to a depth of one to 48 inches, and holes drilled perpendicularly to the facing surfaces to communicate said parallel holes to the facing surfaces of said press platens; means attached to the edges of said press platens and communicating said parallel holes with a source of fluid heat carrier; caul plates covering said facing surfaces of said press platens, said caul plates having a central area permeable both horizontally and vertically to heat carrier fluid, said central area being smaller than the area of the product to be consolidated, and said caul plates also each having a fluid impermeable edge area along the periphery thereof and sealing means for sealing each said caul plate against its respective press platen to prevent escape of fluid heat carrier from the central permeable area.

4. Apparatus according to any one of claims 1, 2 or 3, further comprising means for peripheral hermetical enclosure of products to be consolidated between the press platens, comprising a peripheral elastomeric seal made of compressible heat resistant material and means for lateral support thereof.

5. Apparatus according to claim 4 wherein said lateral support means comprise rigid support bars, two opposite ones of which are movable out of the press when the press is open.

6. Apparatus according to claim 4, wherein said lateral support means comprise wall elements mounted on the upper press plattens and movable vertically therewith.

7. Apparatus according to any of one claims 1, 2 or 3 wherein said caul plates are made at least in part of screen wire or wire cloth, the peripheral edge area thereof being filled with heat resistant plastic material, and said sealing means comprising a heat resistant elastomeric material filling said screen in an annular band inside said peripheral edge area.

8. Apparatus according to any one of claims 1, 2 or 3, wherein said caul plates are formed at least in part of sheet metal in which said central area is provided with slots or holes.

9. Apparatus according to claim 8, wherein each said sheet metal caul plate is also provided in its central area with horizontal grooves along its surface lying adjacent its respective press platten, said sheet metal caul plate being also provided with an annular groove filled with heat resistant elastomer corresponding to said sealing means.

10. Apparatus according to any one of claims 1, 2 or 3, wherein a said caul plate comprises a laminate of screen wire or wire cloth with sheet metal, said screen wire or wire cloth having its peripheral edge area filled with heat-resistant plastic material, and said sealing means comprising a heat-resistant elastomeric material filling said screen in an annular band inside said peripheral edge area, said sheet metal being provided in its central area with slots or holes.

* * * * *